INVENTOR.
LAWRENCE W. WATERS

BY

*Mellin + Hanscom*

ATTORNEYS

Aug. 5, 1952 — L. W. WATERS — 2,605,796
PEACH PITTER
Filed July 18, 1949 — 7 Sheets-Sheet 5
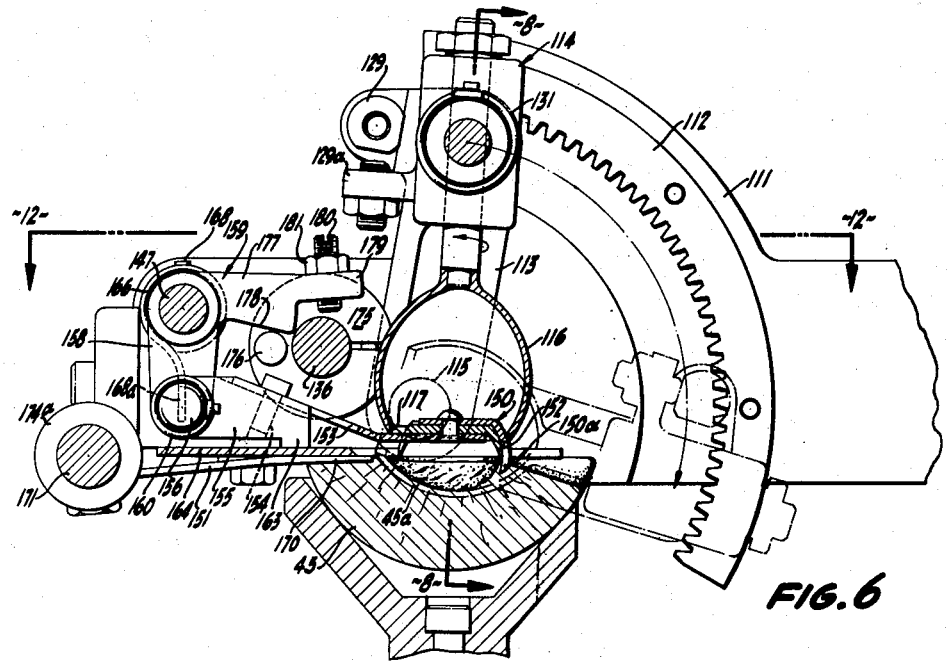
FIG. 6
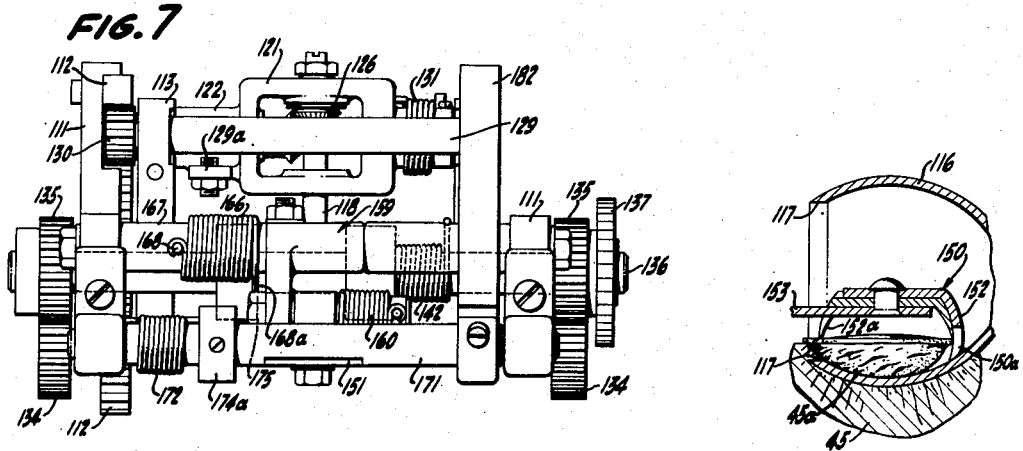
FIG. 7
FIG. 8
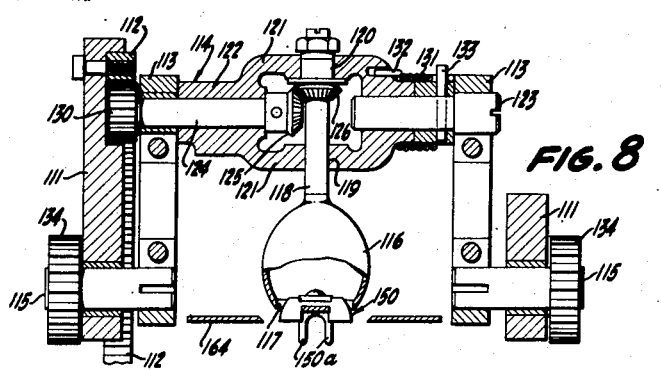
FIG. 15
INVENTOR.
LAWRENCE W. WATERS
BY
Mellin & Hanson
ATTORNEYS INVENTOR.
LAWRENCE W. WATERS
BY
Mellin & Hanscom
ATTORNEYS INVENTOR.
LAWRENCE W. WATERS
BY
*Mellin + Hanscom*
ATTORNEYS Patented Aug. 5, 1952

2,605,796

UNITED STATES PATENT OFFICE 2,605,796

PEACH PITTER

Lawrence W. Waters, Ontario, Calif., assignor to Atlas Imperial Diesel Engine Co., Oakland, Calif., a corporation of Delaware Application July 18, 1949, Serial No. 105,281

12 Claims. (Cl. 146—28)

This invention relates to a peach pitter. More particularly, it relates to a peach pitting machine which is adapted to pit peach halves containing split pits.

This application is a continuation-in-part of my co-pending application entitled, "Peach Pitter," filed August 6, 1948, Serial No. 42,770, and issuing into Patent No. 2,551,076, dated May 1, 1951.

In peach pitting operations employing conventional peach pitting machines it frequently happens that a pit is split in half instead of being separated from the meat of the peach and split pits remain in the halves of the peach. It is necessary, of course, to remove the split pit.

The removal of split pits and whole pits from peach halves is not possible by means of conventional peach pitters, which are adapted to operate only on a whole peach.

It is an object of the present invention to provide an improved form of peach pitter which is adapted to pit peach halves containing split pits and whole pits.

It is a further object of the invention to provide a peach pitter of the character described having improved features as compared with the peach pitter of my co-pending application.

These and other objects of my invention will be apparent from the ensuing description and the appended claims.

The invention is exemplified in the following description and illustrated by way of example in the accompanying drawings in which:

Fig. 6 is a view similar to that of Fig. 5, but on a larger scale.

Fig. 7 is a view taken along the line 7—7 of Fig. 4, showing the pitter unit of Fig. 4 in side elevation.

Fig. 8 is a section taken along the line 8—8 of Fig. 6.

Fig. 15 is an enlarged fragmentary view similar to that of Fig. 5 showing the relation of the cutting edge of the pitting knife to the pit finder.

Figure 1:
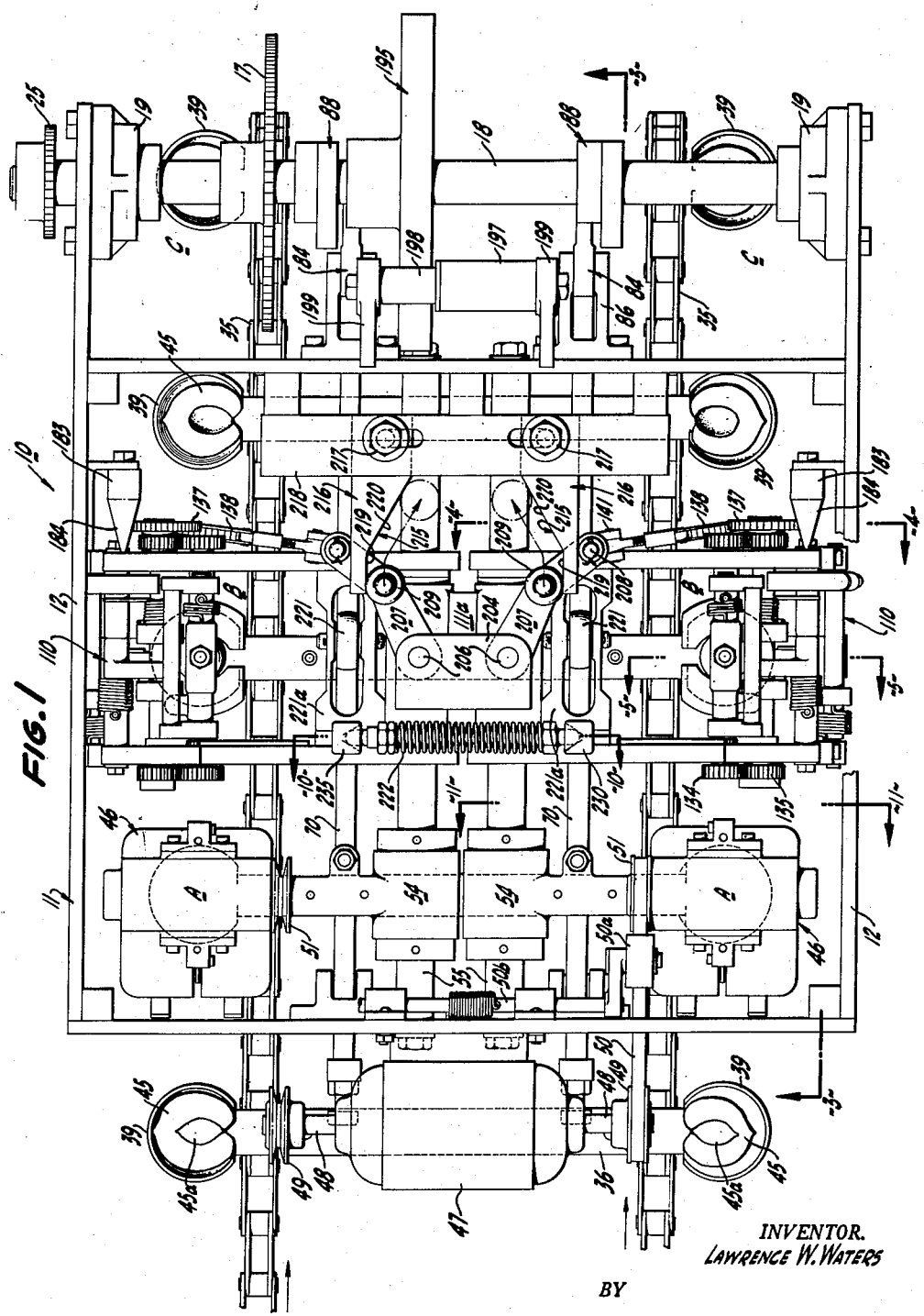
Fig. 1 is a top plan view of the machine.
Figure 2:
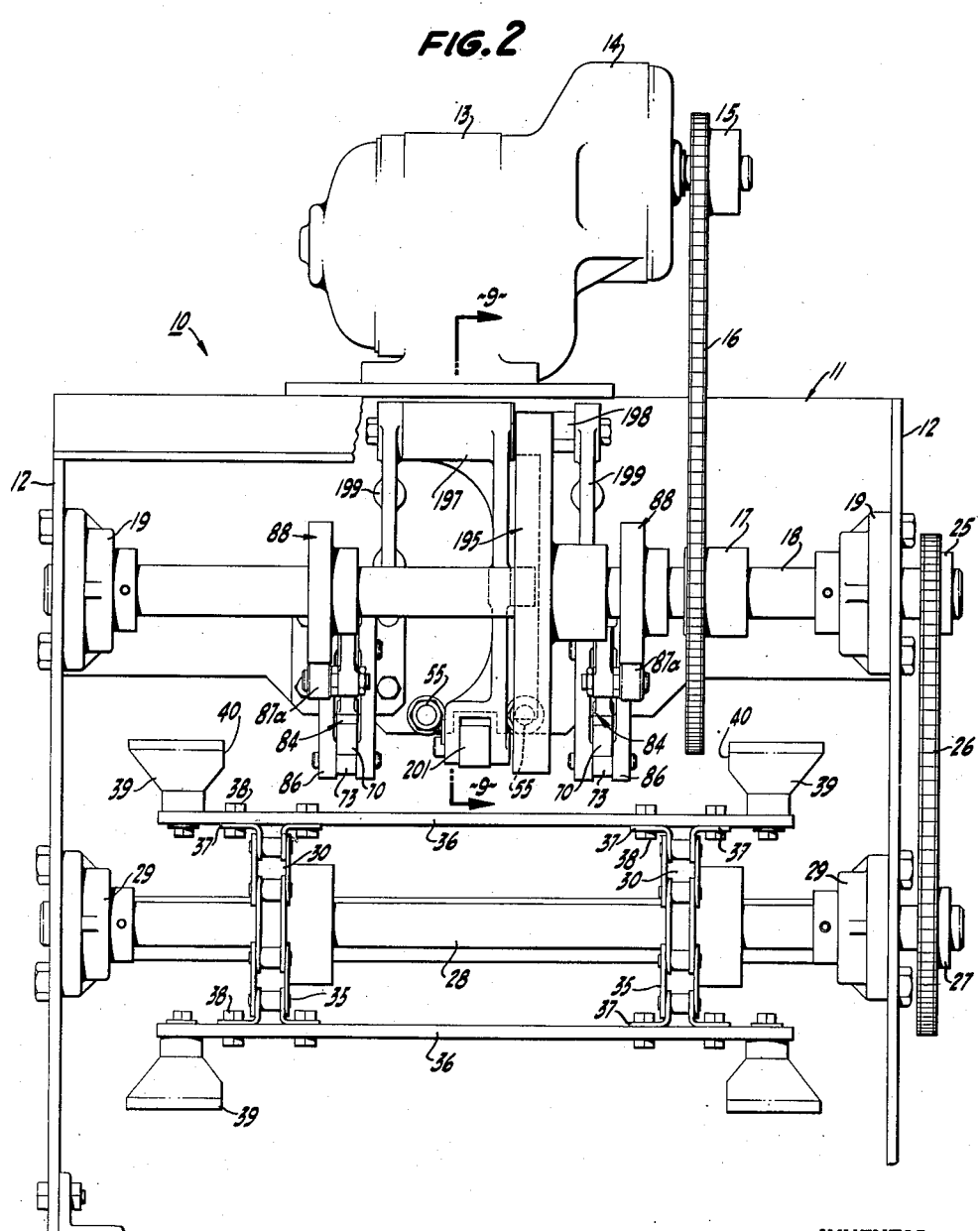
Fig. 2 is an end view of the machine as seen from the right of Fig. 1.
Figure 3:
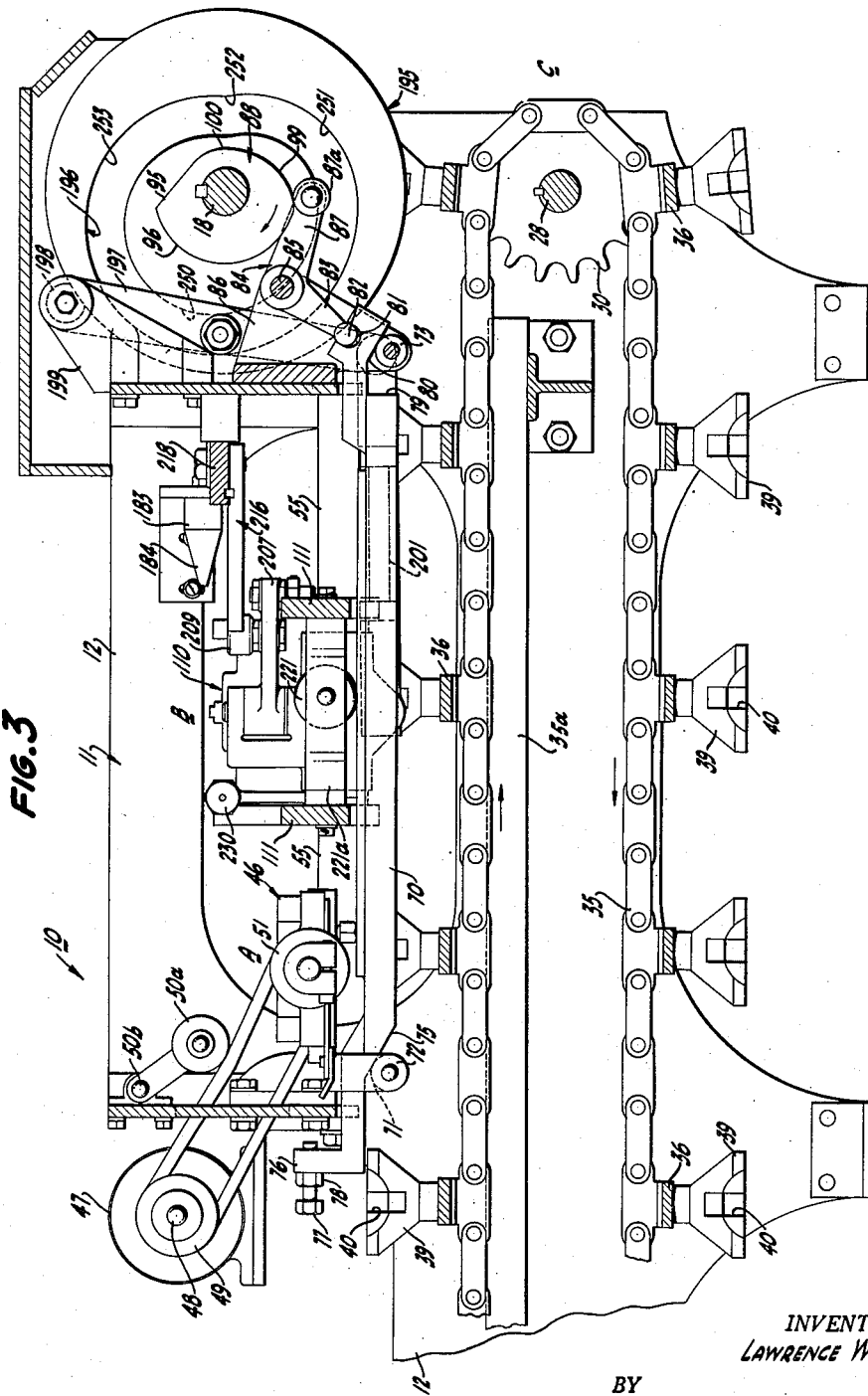
Fig. 3 is a longitudinal section taken along the line 3—3 of Fig. 1.

Referring now to the drawings, and more particularly Figs. 1, 2 and 3, the machine is generally designated as 10, and it comprises a frame 11 including side plates 12. A motor 13 and gear reducer 14 having a sprocket 15 are mounted on the frame. A chain 16 is led over the sprocket 15 and over a sprocket 17 fixed to the main drive shaft 18, which is journaled in bearings 19 fixed to the side plates 12. A sprocket 25 is fixed to one end of the drive shaft 18 and a chain 26 is led over the sprocket 25 and over a sprocket 27 fixed to one end of a conveyor drive shaft 28 which is journaled in bearings 29 fixed to the side plates 12. Sprockets 30 are fixed to the conveyor drive shaft 28, being spaced apart, as illustrated, and disposed symmetrically with respect to the longitudinal center line of the machine. An endless conveyor chain 35 is led over each sprocket 30 and over a similar sprocket (not shown) on a driven shaft (not shown) at the left hand end of the machine as viewed in Figs. 1 and 3. The upper course of each chain 35 is supported and guided by a track 35a suitably anchored to the frame of the machine. Bars 36 extend between and beyond the conveyor chains 35 and are fixed thereto by means of angle brackets 37 and bolts 38, and the bars 36 are disposed in spaced relationship, as illustrated. A pair of fruit cups 39 are fixed to opposite ends of each bar 36 for the purpose of carrying fruit. Recesses 40 are formed in the cups 39 to facilitate removal of the pitted fruit and for convenience of access.

It will thus be apparent that two conveyor lines are provided which operate in unison. Referring to Figs. 1 and 3, peach halves 45 containing pits 45a are carried by the cups 39 and are conveyed from the left to right as viewed in Figs. 1 and 3, from a loading station (not shown) to a topping station A, thence to a pitting station B, and finally, to an unloading station C.

Identical topping units 46 are disposed at the topping station A, one for each of the conveyor chains 36. The topping units are driven by a motor 47 mounted on the frame of the machine, and the motor 47 has a double shaft 48 to the ends of which pulleys 49 are fixed. The topping units 46 are identical in the construction and operation; hence, only one such unit will be described.

Figure 11:
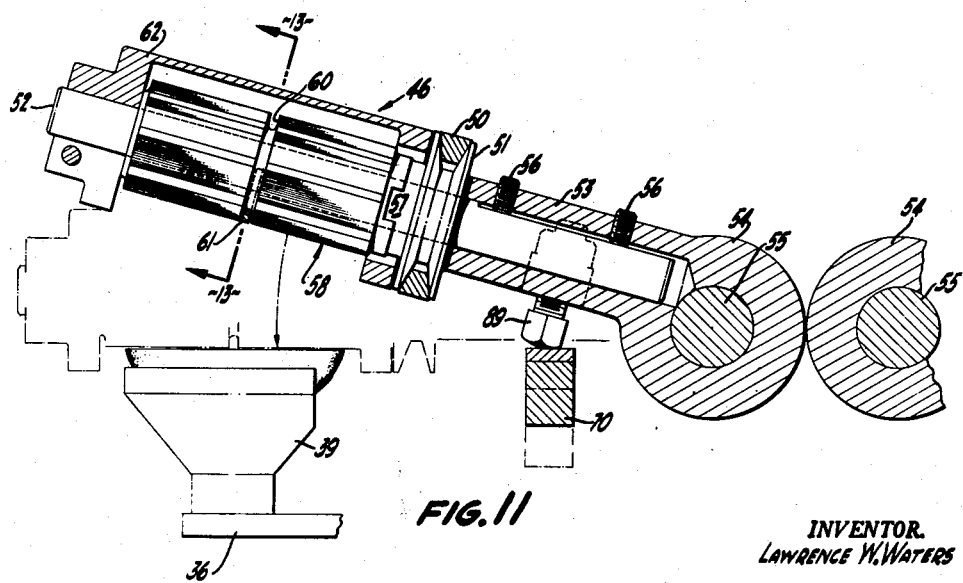
Fig. 11 is a section taken along the line 11—11 of Fig. 1 showing one of the topping units in end elevation.
Figure 14:
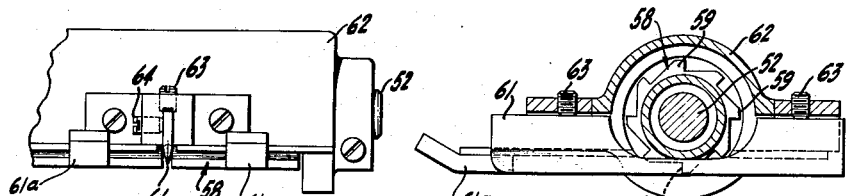
Fig. 14 is a fragmentary view in front elevation of the topping unit of Figs. 11 and 13 as seen from the right of Fig. 13.
Figure 13:
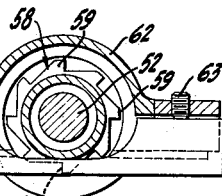
Fig. 13 is a section taken along the line 13—13 of Fig. 11 showing the topping unit of Fig. 11 in transverse vertical section.

A belt 50 is led over pulley 49 and over a pulley 51 which is rotatable on a shaft 52 received within a hollow sleeve 53 (see Fig. 11) which is rotatably mounted at 54 on a pivot shaft 55. Belt 50 is suitably tensioned by means of an idler roller 50a mounted on a spring biased shaft 50b. The pivot shafts 55 are disposed in parallelism and symmetrically with respect to the longitudinal center line of the machine and they are anchored to the frame of the machine and extend longitudinally thereof. Set screws 56 are provided to adjust the topping unit. The pulley 51 is keyed at 57 to a rotary topping knife 58 which is rotatable on the shaft 52. The knife 58 (see also Figs. 13 and 14) is formed with teeth or blades 59 and with a centrally located annular groove 60 within which a gauging member 61 is received. The gauging member 61 is mounted on a housing and guard member 62 which is clamped to the outer end of the shaft 52. The gauging member 61 is adjustable by means of set screws 63 and it is clamped in adjusted position by means of a set screw 64. Guide plates 61a are also provided.

The knife 58 is rapidly rotated about the axis of shaft 52 by means of the motor 47 and it is also oscillated about the axis of pivot shaft 55 by means of a cam bar 70. The cam bars 70 extend longitudinally of the machine (see Fig. 3) and they are disposed symmetrically with respect to the center line of the machine, there being one bar for each conveyor chain 35. Bar 70 is slidably mounted at its rearward or left hand end as viewed in Figs. 1 and 3, on a roller 71 which is carried by brackets 72 fixed to the frame of the machine. At its other or forward end, bar 70 is slidably carried on a roller 73 mounted on a bracket 86. Bar 70 is formed at its rearward end with a cam surface 75 and with a bracket 76 to receive a stop screw 77 and a lock nut 78. It is also formed at its other end with a notch 79 having a cam surface 80 similar to the cam surface 75 and with a notch 81 to receive the rounded end 82 of an arm 83 of a bell crank lever 84 which is rotatable on a shaft 85 which is mounted in a frame bracket 86. The other arm 87 of the bell crank 84 has a cam follower roller 87a rotatably mounted thereon which rides on the periphery of a cam 88 which is keyed to the drive shaft 18. Topping unit 46 has a cap screw 89 fixed to its sleeve 53, which rests on the cam bar 70, which thereby determines the angular position of the topping knife 58. (See Fig. 11.)

It will be apparent that, as the motors 13 and 47 operate, the rotary knife 58 of each topping unit will rotate about its own axis, and that it will also oscillate about the adjacent pivot shaft 55. The cam 88 is formed with a rise 95 which operates to rock the bell crank lever 84 in a clockwise direction as viewed in Fig. 3. This will cause shifting of the bar 70 to the left and will, accordingly, cause cam surfaces 75 to ride up the rollers 71, thus lifting bars 70. This will result in pivoting the topping unit 46 upwardly. Thereafter, a long high dwell 96 acts to hold the topping unit in its up position, then a recede 99 on the cam 88 acts to allow the bell crank lever to rock in a counter-clockwise direction and the bar 70 to return to its down position, thereby lowering the topping unit. A short dwell 100 on the cam 88 produces a corresponding short dwell of the topping unit in its down position and it is then lifted again by the rise 95, thus completing a cycle of operation.

The design of the cam 88 is such that the topping unit is raised between each succeeding fruit cup and lowered just as the next fruit cup passes under the sharpened gauge members 61. The knife edge of the members 61 cuts through the meat above the level of the pit and rides over the top of said pit. It may be seen that as the fruit passes under the members 61, the rotating knife 58, being tangential with the lower edge of the gauge members, will remove the excess meat of the peach above the level of the pit and thereby expose the pit for subsequent operation of the pitting unit. This raising and lowering of the topping unit will gauge and trim each fruit half individually before passing on to the pitting operation.

Figure 4:
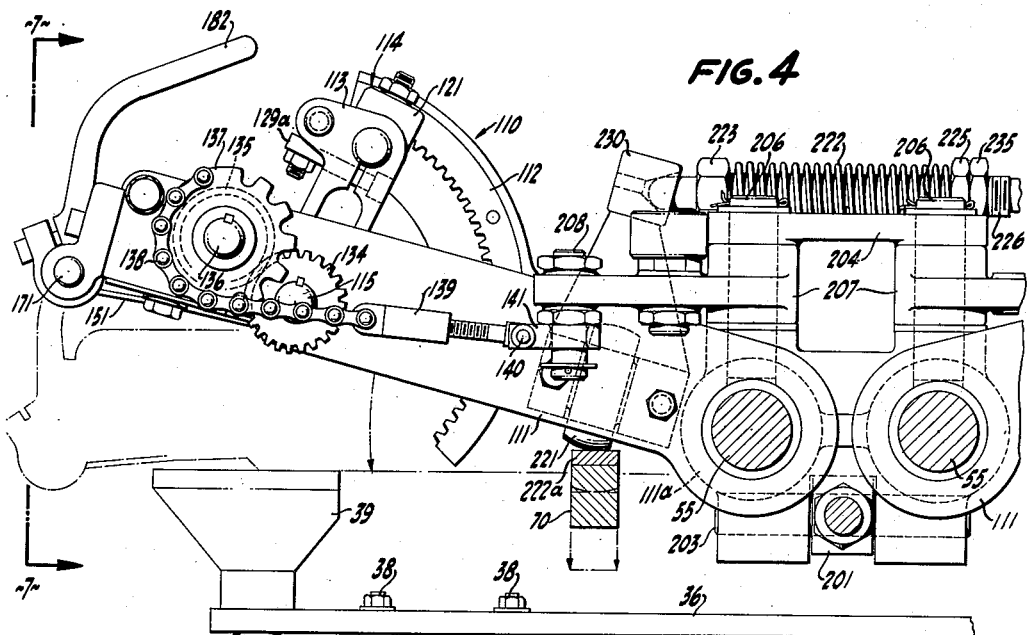
Fig. 4 is a section taken along the line 4—4 of Fig. 1, showing one of the pitter units in end elevation.
Figure 5:
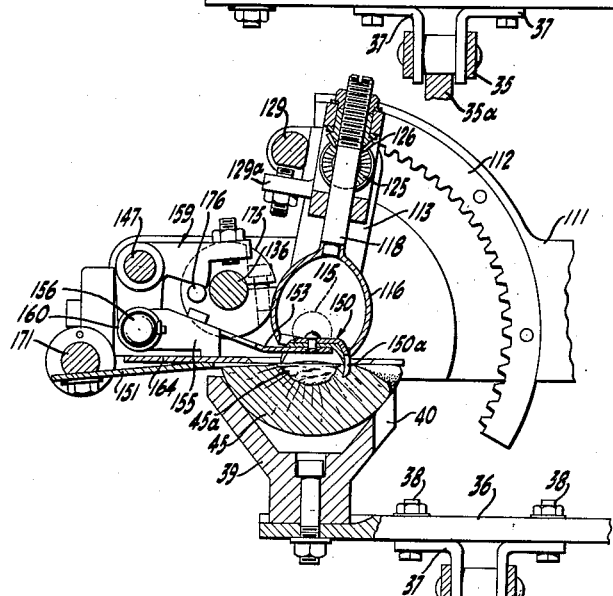
Fig. 5 is a section taken along the line 5—5 of Fig. 1, being a section through the pitter unit shown in Fig. 4.

A pitter unit 110 is provided for each conveyor chain 35. The pitter units 110 are identical in construction and operation; hence, only one of them will be described. Referring now more particularly to Figs. 4 and 5, the left hand pitter unit 110 (as viewed in Fig. 4) is supported by means of spaced arms 111 for pivotal movement about the left hand pivot shaft 55. The inner ends of the arms 111 are journalled in a tubular sleeve 111a which is slidable along and rotatable about the pivot shaft 55. A sector gear 112 is fixed to one of the arms 111, being disposed in a vertical plane, and the upright legs 113 of a pitter knife frame 114 are fixed to stub shafts 115 which are journalled in arms 111. As is best shown in Fig. 8, a hollow truncated ellipsoidal pitter knife 116 having a knife edge 117 is provided with a spindle 118 which is journalled at 119 and 120 in the bifurcated portion 121 of a cross piece 122 of the frame 114. The cross piece 122 is mounted at one end on a pin 123 fixed to one of the upright legs 113 of the frame and at its other end on a shaft 124 journalled in the opposite upright leg of the frame. Bevel gears 125 and 126 fixed to shaft 124 and spindle 118, respectively, provide a driving connection between the shaft 124 and spindle 118. A pinion 130 is fixed to the outer end of the shaft 124 and it meshes with the sector gear 112. A torsion spring 131 is pinned at 132 to the cross piece 122 and at 133 to the pin 123. The torsion spring 131 urges the pitter knife in a clockwise direction as viewed in Fig. 6, for a purpose explained hereinafter. As is also illustrated, adjustable stop members 129 and 129a are fixed to legs 113 and cross piece 122, respectively, to limit clockwise movement of the pitter knife under the influence of torsion spring 131.

The legs 113 of frame 114 are keyed to the stub shafts 115, which are journalled in the arms 111 as explained hereinabove, and a gear 134 is fixed to the outer end of each of the stub shafts 114. As is best shown in Figs. 4 and 7, each gear 134 meshes with a gear 135 fixed to one end of a shaft 136 which is journaled in the arms 111, and to one end of the shaft 136 is fixed a sprocket 137 to which a chain 138 is pinned and with which the sprocket meshes. The other end of the chain 138 is fixed to one end of an adjustable rod 139, the other end of which is fixed by means of a pin 140 to a link 141 (see Figs. 1 and 4). The means employed for actuating the link 141 is described hereinafter. A torsion spring 142 is pinned at 143 to, and is wound up by, a collar 144 clamped to the shaft 136, and the other end of the spring 142 bears at 145 against a tubular spacer mounted on a shaft 147, so as to urge the shaft 136 in a clockwise direction as viewed in Fig. 4.

The pitter unit 110 is also provided with a pit finder 150 and with a stripper element 151, which are best shown in Fig. 6 and which will now be described.

The pit finder 150 is formed with an inverted cup-shaped pit-gauging member 152a and with concave-convex prongs 152, and it is mounted on one end of an arm or bracket 153 which is adjustably mounted at 154 on an arm or lever 155 fixed to a stub shaft 156. The stub shaft 156 is fixed to the outer end of one arm 158 of a bell crank lever 159 which is fulcrumed on shaft 147. The arm 155 and pit finder 150 are held in down position as shown in Fig. 6 by means of a torsion spring 160 wound on the stub shaft 156 and pinned thereto at 161 and at 162 to the arm 155. A lug 163 on the arm 155 limits against a gauge plate 164. A torsion spring 166 is wound on a sleeve or spacer 167 which receives the shaft 147, and it is pinned at 168 to the sleeve and at 168a to the bell crank 159. It will be apparent that spring 160 acts to hold the pit finder 150 in downward position and that the spring 166 urges the pit finder inwardly of a peach pit. The gauge plate 164 is formed with an elliptical opening 169 and the pit finder projects therethrough and near the far edge of the opening with respect to the bell crank 159.

Figure 12:
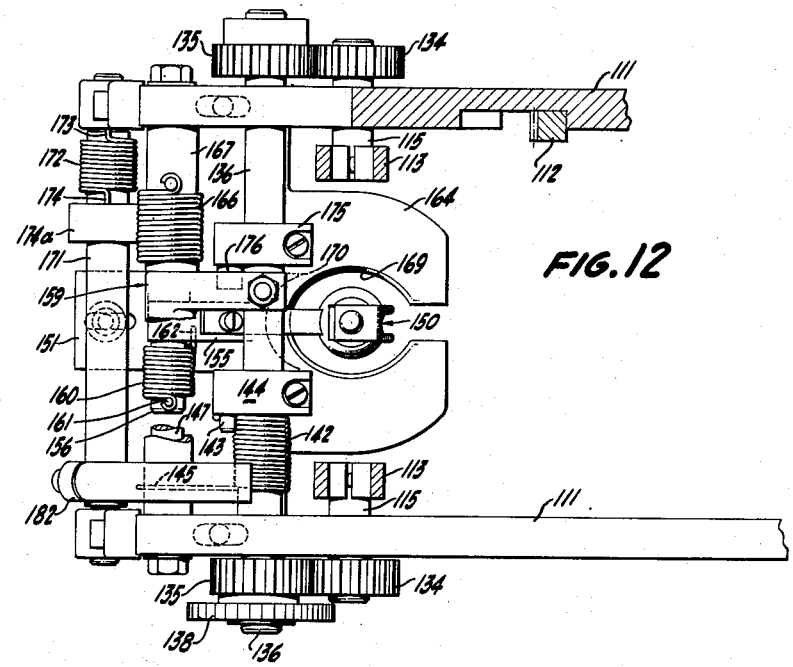
Fig. 12 is a section taken along the line 12—12 of Fig. 6 showing the pitter unit of Figs. 4 and 6 in top plan view.

The stripper element 151 is formed by means of a plate having a tapered and concave outer end 170 (see Figs. 6 and 12), and it is adjustably mounted at its other end on a shaft 171 which is journaled in the outer ends of the arms 111. A torsion spring 172 is wound on the shaft 171, being pinned at 173 to one of the arms 111 and at 174 to a collar 174a which is clamped to the shaft 171. The spring 172 urges the shaft 171 in a counter-clockwise direction as viewed in Fig. 6, so as to hold the stripper plate 151 in its up position abutting the gauge plate 164, as shown in Fig. 6.

The pit finder 150 is actuated, in the manner and for the purpose described hereinafter, by means of a cam 175 clamped to the shaft 136. The cam 175 is provided with a pin 176 which cooperates with an arm 177 of the bell crank 159. The arm 177 is formed with a detent 178 and with a finger 179 holding a set screw 180 which is clamped in adjusted position by means of a lock nut 181. It will be apparent that when the cam 175 moves in a counter-clockwise direction as viewed in Fig. 6, the pin 176 will recede from the detent 178, thus allowing the torsion spring 166 to rock the bell crank 159 in a counter-clockwise direction, thus retracting the pit finder 150. When the cam 175 moves in clockwise direction, the pin 176, bearing against the detent 178, will rock the bell crank 159 and will advance the pit finder 150 to the position shown in Fig. 5. The set screw 180, by abutment with shaft 136, limits retraction of the pit finder 150.

The stripper element 151 is actuated by a lever 182 (see Fig. 4) fixed to the stripper shaft 171 and a cam 183 (see Fig. 1) fixed to the frame of the machine and having a tapered conical surface 184.

It will be apparent that normally, unless positively urged to different positions, the pitter knife frame 114 will be held in approximately upright position, as shown in Figs. 4 and 6, by means of the torsion spring 142, and that the knife edge 117 of the pitter knife 116 will be held firmly against the pit finder prongs 152 by the torsion spring 131. It will also be apparent that the pit finder will be urged to its retracted position by the torsion spring 166 and in the down position by means of the torsion spring 160 except when restrained by pin 176 on cam 175; and that the stripper element 151 will be held in the up position abutting the gauge plate 164 by means of the torsion spring 172. In these relative positions the various components of the pitter unit 110 are in readiness for the commencement of a pitting cycle.

Figure 9:
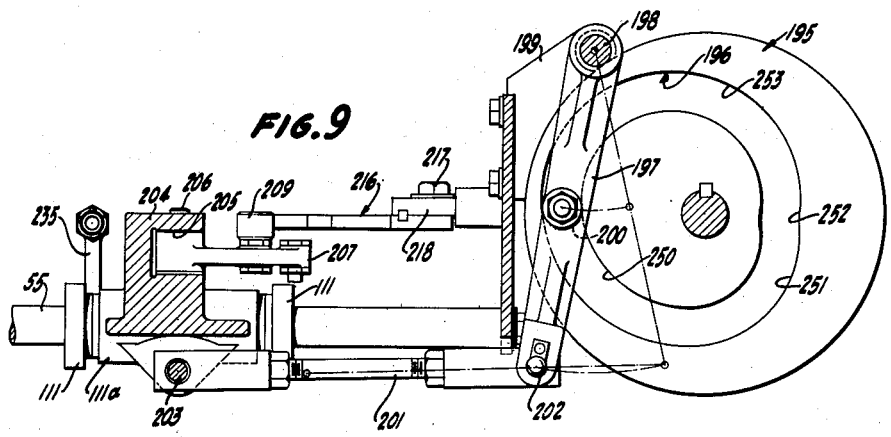
Fig. 9 is a section taken along the line 9—9 of Fig. 2, showing the cam means for operating the pitter unit.
Figure 10:
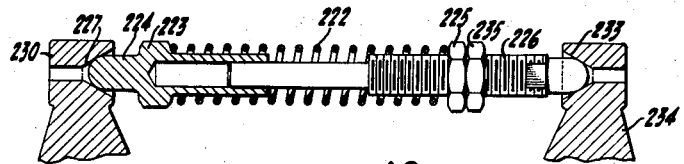
Fig. 10 is a section taken along the line 10—10 of Fig. 1, showing a part of the actuating mechanism for the pitter units.

Referring now more particularly to Figs. 1, 3, 4, 9 and 10, a cam 195, best shown in Figs. 3 and 9, is provided which is keyed to the main drive shaft 18. The cam 195 is formed with a cam groove 196. A lever 197 is provided which is fulcrumed on a shaft 198 mounted in frame brackets 199 which are bolted to the frame of the machine. A roller 200 is rotatably mounted on the lever 197 so as to ride in the cam groove 196, and the other end of the lever 197 is connected by means of a hinge pin 202 to one end of an adjustable rod 201, the other end of which is connected by means of a hinge pin 203 to the sleeve 111a. A boss 204 is formed on the sleeve 111a, and it is recessed at 205 to receive a pin 206 on which one end of a lever 207 is fulcrumed. The other end of the lever 207 is connected by means of a hinge pin 208 to the link 141. A roller 209, best shown in Fig. 1, is rotatably mounted at the same end of the lever 207 to ride upon a cam surface 215 formed on a cam bracket 216 which is adjustably bolted at 217 to a frame bracket 218 mounted on the frame of the machine. The cam surface 215 lies in a horizontal plane and it is formed with a dwell portion 219 which is parallel to the center line of the machine and with an inwardly and forwardly slanting portion 220. It is intended that the roller 209 travel from its retracted position as shown in full lines in Fig. 1 to an extended position as shown in broken lines.

As shown in Figs. 1, 3 and 4, a roller 221 is rotatably mounted on a spacer 221a which is fixed to and disposed between the arm 111. The roller 221 is disposed above and rests on the cam bar 70, which is provided with a wearing liner 222a. It will be apparent that, as the cam bar 70 moves rearwardly or to the left as viewed in Figs. 1 and 3, the arms 111, and with them the pitter unit 110, will be rocked upwardly to the position shown in full lines in Fig. 4, and that on return of the bar 70 the arms 111 and the pitter unit 110 will be rocked downwardly to the position shown in broken lines in Fig. 4. The arms 111 and pitter unit 110 are urged to their down position by means of a compression spring 222 (see Figs. 4 and 10). The spring 222 is compressed between a collar 223 formed on a pin 224, and a nut 225 on the threaded portion of a pin 226. One end of the pin 224 is received in a recess 227 formed in a boss 230 which is formed on one of the arms 111. One end of the pin 226 is received within a similar recess 233 formed in a similar boss 234 on the opposite arm 111. The pin 224 is tubular in construction so as to slidably receive the inner end of the pin 226, and the compression of spring 222 is adjustable by means of nut 225 and is clamped in adjusted position by means of a nut 235.

Operation of the machine is as follows: The motor 13 is started, and also the motor 47, to drive the various elements of the machine. Peach halves are loaded in the fruit cups 39, manually or otherwise, at the rearward or left hand end of the machine as viewed in Fig. 3, with the pits transverse to the center line of the machine, as illustrated. The peach halves are carried to the right by means of the conveyor chains 35. At the topping station A each topping unit 46 is rocked upwardly to the position shown in full lines in Fig. 11, in timed relation to travel of the fruit, as a fruit cup approaches the topping station, and it is then rocked downwardly over the fruit cup so the topping knife 58 will trim across the entire peach. This, of course, is accomplished by means of the cam bar 70 in cooperation with the cap screw 89. The cam bar 70 is actuated by the main drive motor 13 through the means described hereinabove. The rotary knife 58 is driven by the motor 47 and it operates to cut off excess meat from the fruit so as to expose the pit for subsequent operation of the pit finder and pitting knife. Again in timed relation to progress of the fruit cups through the machine, the knife 58 is rocked upwardly to be in a position to start the gauging of the next fruit half.

The relative positions normally occupied by the various elements of the pitting unit 110 have been described hereinabove; that is to say, the pitter knife 116 is held in approximately upright position with its knife edge 117 pressed firmly against the pit finder 150, as shown in Fig. 5. The pit finder is held in advanced position as there shown, and the stripper element 151 is held in its up position abutting the gauging plate 164. Also, the pitter unit 110 is held in its down position by means of the compression spring 222.

As a fruit cup approaches the pitting unit 110, the cam bar 70 operates to pivot the arms 111 and pitter unit 110 upwardly to the position shown in full lines in Fig. 4, thus clearing the way for the fruit cup and fruit to approach the pitting station. When the fruit cup is in appropriate position, cam bar 70 is retracted, thus allowing the pitting unit to pivot downwardly to pitting position under its own weight and under the urging of compression spring 222.

The main pitter cam 195 operates the various elements of the pitter unit 110 while rocking motion is imparted thereto by means of the cam 88 and cam bar 70. The main pitter cam 195, as stated, is formed with a cam groove 196. The cam groove 196 comprises a long high dwell 250, a recede 251 which changes very rapidly at 252 to a rise 253. When the roller 200 on the pitter operating lever 197 is riding in the dwell portion 250 of cam groove 196, the sleeve 111 and the pitter unit 110 are in their relatively rearward position. Counter-clockwise rotation is imparted to the main drive shaft 18 as viewed in Fig. 9. Therefore, as the pitter actuator lever 197 commences to ride in the recede 251 of cam groove 196, the sleeve 111 and pitter unit 110 are pulled forwardly along the pivot shaft 55. This will cause cam roller 209 (see Fig. 1) on lever 207 to ride, first along the horizontal dwell portion 219 of cam surface 215 and then inwardly along the slanting portion 220. Corresponding clockwise movement will be imparted to the link 141 as the roller 209 rides inwardly along the surface 220.

As the cam follower roller 209 rides inwardly along the slanting portion 220 of the cam surface 215, the pitter head drive chain 138 will, of course, be pulled inwardly and the pitter head drive sprocket 137 will be rotated counter-clockwise as viewed in Fig. 4, thus imparting a similar motion to the shaft 136. As will be apparent from Fig. 6, pin 176 will move away from detent 178. Bell crank 159 will rock in clockwise direction under the influence of torsion spring 166, thus retracting pit finder 150. During the retracting of the pit finder 150, the pit finder prongs 150a locate the position of the pit, and since the pitter knife 116 is spring-biased to hold the knife against these prongs, the start of the pitting cut is determined by the position of the pit finder. Once the pitter knife passes the ends of the prongs 150a, the spring-biasing of the pitter knife 116 causes the knife edge of the pitter to yieldingly engage the pit so that the pit gauges the cut of the pitter knife into the fruit. As before described, the pit finder 150 is spring-biased downwardly about the shaft 156 due to the torsion spring 160, and this allows the finder to be raised by the pit of the fruit as the pitter knife 116 makes the cut around the pit, thus allowing the knife to cut a minimum amount of meat exteriorly of the pit. Simultaneously, counter-clockwise motion of shaft 136 will cause clockwise motion of stub shafts 115 through the medium of gears 135 and 134. Thus clockwise motion, as viewed in Fig. 6, will be imparted to the pitter frame 114, causing it to travel in an arc. Meanwhile, torsion spring 131 will operate to hold the knife edge 117 of pitter knife 116 firmly against the knife edge 152 of the pit finder 150 (see Figs. 6, 8 and 17). Also, as the pitter frame 114 and pitter knife 116 travel through an arc from the solid line position to the broken line position of Fig. 6, engagement of pinion 130 with sector gear 112 will impart rotary motion to the pitter knife 116 about its spindle, through the medium of shaft 124 and bevel gears 125 and 126. Thus, the pitter knife will be rapidly rotated about its own axis and will be dipped so as to follow accurately the contour of the pit until it has reached the position shown in broken lines in Fig. 6. Meanwhile, the cam roller 209 will have reached the position shown in broken lines in Fig. 1, and cam roller 200 will have reached the point 252 in cam groove 196 (see Fig. 9). Thereafter, cam roller 200 will travel in rise 253 of cam groove 196 and corresponding rearward movement will be imparted to the sleeve 111a and to the arms 111 and the pitter unit 110. The cam rollers 209 will ride outwardly along the slanting cam surfaces 220 and the pitter unit drive chain 138 will be slackened. Torsion spring 142 will act immediately to take up slack in the chain 138, thus imparting clockwise movement to shaft 136 and corresponding counter-clockwise movement to gear 134, which will operate to rotate the pitter frame 114 in a counter-clockwise direction to the upright position shown in full lines in Fig. 6. Clockwise motion of the shaft 136 will also cause pin 176 to rock lever 159 in clockwise direction, thus acting to move pit finder 150 to its extended position as shown in Fig. 5.

As mentioned hereinabove, rocking motion about the pivot shaft 55 is imparted to the pitter unit 110 by means of the cam 88, through the medium of cam bar 70. This rocking movement is timed in relation to operation of the pitter knife 116 and pit finder 151, so as to lift the pitter unit to clear a path for an approaching fruit cup and fruit, lower the pitter unit into operative position at the proper moment and then lift it again after the pitting operation has been completed. Also, the entire pitter unit moves with the fruit during pitting.

The stripper plate 151 is also operated in timed relation to operation of the pitter unit 110. Thus, referring to Figs. 1, 4 and 6, the stripper operating lever 182 contacts cam 183 causing clockwise movement of the stripper shaft 171 and of the stripper plate 151, as viewed in Fig. 6. The fruit frequently exhibits a tendency to adhere to the gauge plate 164, and clockwise motion is imparted to the stripper plate to strip the fruit from the gauge plate. This action is timed to occur just as the pitter unit is being raised from the fruit.

Figure 16:
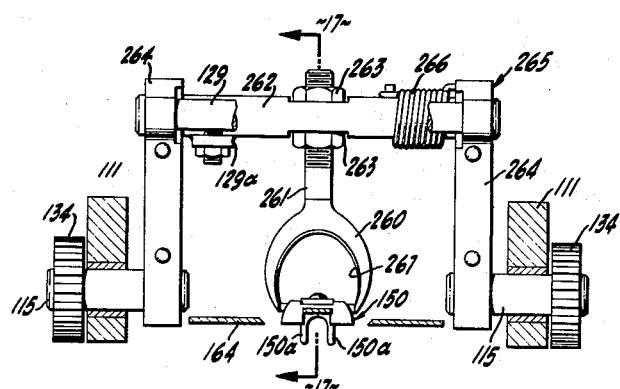
Fig. 16 is a view similar to that of Fig. 8 showing a modified form of pitting knife.
Figure 17:
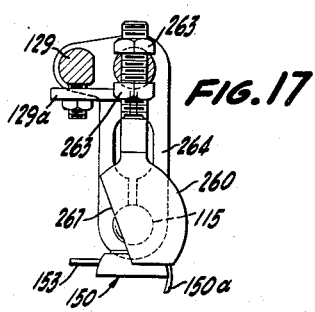
Fig. 17 is a section taken along the line 17—17 of Fig. 16.

Referring now to Figs. 16 and 17, a modified form of pitter knife 260 is illustrated. This pitter knife has a spindle 261 which is non-rotatably and adjustably mounted on a shaft 262 by means of nuts 263. The shaft 262 is journaled in legs 264 of the pitter knife frame 265 and is urged in a clockwise direction as viewed in Fig. 17, so as to bear firmly against the pit finder 150, by means of a torsion spring 266. The knife 260 is cut away as illustrated to provide an open face 267. The angle of this face and the diameter of the ellipsoidal knife along the minor axis determines the depth and shape of the cut, and by providing an assortment of knives 260, they may be substituted, one for another, in accordance with the pit characteristics of the peaches being processed.

Other parts of pitter knife assembly of Figs. 16 and 17 which are similar to the pitter knife assembly of Figs. 6 and 8, are similarly numbered and require no further description.

It will thus be apparent that a machine has been provided which effectively operates to pit peaches. More particularly it operates to pit peach halves having whole or split pits therein.

Among the numerous advantages of the machine may be mentioned the following: It provides a complete machine for both topping the peach, to provide a clean surface and to expose the pit, and a pitting unit. Further, the various operations are accurately timed so as to clear a path for fruit approaching and leaving the operating stations. Spring means are provided for normally holding the various operating elements of the pitter unit in the appropriate position for commencement of a cycle of operation. A pit finder is provided and means for operating the same, such that the finder is held in an outward position to engage an end of the pit, and it is then retracted to clamp the pit and the peach firmly in place and to guide the pitter knife during its cutting operation.

It will be apparent that the pitter knife, in rotating in a vertical plane and also about its spindle axis, will make a thorough and clean cut, and that it will be accurately guided by the pit finder prongs so that the cut will conform closely to the shape and size of the pit. It will also be seen from Fig. 15 that, after leaving the pit finder prongs, the pitter knife will be guided by the pit itself. Thus the keel of the knife edge 117 bears against the pit and the knife is thereby guided by the pit but has little or no tendency to bite into the pit.

While I have shown the preferred form of my invention, it is to be understood that various changes may be made therein by those skilled in the art without departing from the spirit of the invention as defined in the appended claims.

Having thus described my invention, what I claim and desire to secure by Letters Patent is:

1. A peach pitting machine comprising a frame defining a topping station and a pitting station, continuous conveyor means disposed longitudinally of the frame, fruit holding means fixed to said conveyor means in uniformly spaced relationship, a rotatable topping knife, means for rotating the same, means mounting the topping knife at said topping station for oscillatory movement in a plane transecting the path of travel of the fruit, a pitting knife, means mounting the same for oscillatory movement in a plane transecting the path of travel of the fruit, means for operating the pitting knife to make a pitting cut, and cam means operable to oscillate said topping knife and pitting knife in timed relation to travel of the fruit to clear a path for fruit entering and leaving the topping and pitting stations and to present said knives to the fruit to accomplish the topping and pitting operations.

2. A peach pitting machine comprising a frame defining a topping station and a pitting station, continuous conveyor means disposed longitudinally of the frame, fruit holding means fixed to said conveyor means in uniformly spaced relationship, a rotatable topping knife, means for rotating the same, means mounting the topping knife at said topping station for oscillatory movement in a plane transecting the path of travel of the fruit, a pitting knife, means mounting the same for oscillatory movement in a plane transecting the path of travel of the fruit, means for operating the pitting knife to make a pitting cut, and cam means operable to oscillate said topping knife and pitting knife in timed relation to travel of the fruit to clear a path for fruit entering and leaving the topping and pitting stations and to present said knives to the fruit to accomplish the topping and pitting operations, said cam means comprising a single reciprocable bar extending longitudinally of the machine and operable, by reciprocation, to oscillate said knives.

3. A peach pitter comprising a pit finder having a prong for finding a pit, means for moving the pit finder in one plane to enable it to locate a pit and maintaining said pit finder in such location until after the pit is disunited from the peach, a pitting knife engaging said pit finder, a shaft to which the pitting knife is secured, arms pivotally supporting the shaft for pivotal movement about an axis spaced from the knife, resilient means urging said shaft to pivot in a direction to maintain engagement between the knife and the finder, and means for oscillating said arms about an axis adjacent the finder to thereby oscillate the knife to scoop out a pit.

4. A peach pitter comprising a pit finder having a prong for finding a pit, means for moving the pit finder in one plane to enable it to locate a pit and maintaining said pit finder in such location until after the pit is disunited from the peach, a pitting knife engaging said pit finder, a shaft to which the pitting knife is secured, arms pivotally supporting the shaft for pivotal movement about an axis spaced from the knife, resilient means urging said shaft to pivot in a direction to maintain engagement between the knife and the finder, and means for oscillating said arms about an axis adjacent the finder to thereby oscillate the knife to scoop out a pit, said pit finder being yieldably mounted to enable it to be displaced from said one plane by said pit during separation of the pit from the meat of the peach.

5. A peach pitter comprising a pit finder having a prong for finding a pit, means for moving the pit finder in one plane to enable it to locate a pit and maintaining said pit finder in such location until after the pit is disunited from the meat of the peach, a pitting knife having a circular cutting edge, a shaft to which the pitting knife is secured, arms pivotally supporting the shaft for pivotal movement about an axis spaced from the knife, resilient means urging said shaft to pivot in a direction maintaining engagement between the knife and finder, means for oscillating said arms about an axis adjacent the finder to thereby oscillate the knife to scoop out a pit, and means for rotating said shaft and therefore the knife during oscillation of said knife.

6. A peach pitter comprising a pit finder having a prong for finding a pit, means for moving the pit finder in one direction to enable it to locate a pit and maintaining said pit finder in such location until after the pit is disunited from the peach, a pitting knife engaging said pit finder, a shaft to which the pitting knife is secured, arms pivotally supporting the shaft for pivotal movement about an axis spaced from the knife and perpendicular to the axis of the shaft, resilient means urging said shaft to pivot in a direction to maintain engagement between the knife and the finder, and means for oscillating said arms about an axis adjacent the finder to thereby oscillate the knife to scoop out a pit.

7. A peach pitter comprising a pit finder having a prong for finding a pit, means for moving the pit finder in one direction to enable it to locate a pit and maintaining said pit finder in such location until after the pit is disunited from the peach, a pitting knife engaging said pit finder, a shaft to which the pitting knife is secured, arms pivotally supporting the shaft for pivotal movement about an axis spaced from the knife and perpendicular to the axis of the shaft, resilient means urging said shaft to pivot in a direction to maintain engagement between the knife and the finder, and means for oscillating said arms about an axis parallel to the first named axis, perpendicular to the axis of the shaft, and disposed adjacent to the finder to thereby oscillate the knife to scoop out a pit.

8. A peach pitter comprising a pit finder having a prong for finding a pit, means for moving the pit finder in one direction to enable it to locate a pit and maintaining said pit finder in such location until after the pit is disunited from the peach, a pitting knife engaging said pit finder, a shaft to which the pitting knife is secured, arms pivotally supporting the shaft for pivotal movement about an axis spaced from the knife and perpendicular to the axis of the shaft, resilient means urging said shaft to pivot in a direction to maintain engagement between the knife and the finder, and means for oscillating said arms about an axis parallel to the first named axis, perpendicular to the axis of the shaft, and disposed adjacent to the finder to thereby oscillate the knife to scoop out a pit, said pit finder being yieldably mounted to enable it to be displaced from the plane of its movement by said pit during separation of the pit from the meat of the peach.

9. A peach pitter comprising a pit finder having a prong for finding a pit, means for moving the pit finder in one direction to enable it to locate a pit and maintaining said pit finder in such location until after the pit is disunited from the peach, a pitting knife engaging said pit finder, a shaft to which the pitting knife is secured, arms pivotally supporting the shaft for pivotal movement about an axis spaced from the knife and perpendicular to the axis of the shaft, resilient means urging said shaft to pivot in a direction to maintain engagement between the knife and the finder, means for oscillating said arms about an axis parallel to the first named axis, perpendicular to the axis of the shaft, and disposed adjacent to the finder to thereby oscillate the knife to scoop out a pit, and means for rotating said shaft and therefore the knife during oscillation of said knife.

10. A peach pitter, comprising a pit finder, means for moving the pit finder to enable it to locate a pit, a pitting knife directly engaging said finder and being mounted for movement with the finder, resilient means urging the knife to remain in engagement with the finder, means for oscillating the knife about an axis perpendicular to the direction of travel of the finder to enable the knife to scoop out a pit, and means for rotating the knife about another axis perpendicular to the axis of oscillation.

11. A peach pitter, comprising a pit finder, means for moving the pit finder to enable it to locate a pit and maintaining said pit finder in such location until after a pit is disunited from the peach, a pitting knife directly engaging said finder and being mounted for movement with the finder, said knife having a circular cutting edge, resilient means urging the knife to remain in engagement with the finder, means for oscillating the knife about an axis perpendicular to the direction of travel of the finder to enable the knife to scoop out a pit, and means for rotating the knife about another axis perpendicular to the axis of oscillation and perpendicular to the plane containing the circular cutting edge of the knife.

12. A peach pitter, comprising a pit finder, means for moving the pit finder to enable it to locate a pit, a pitting knife directly engaging said finder and being mounted for movement with the finder, resilient means urging the knife to remain in engagement with the finder, means for oscillating the knife about an axis perpendicular to the direction of travel of the finder to enable the knife to scoop out a pit, and means for rotating the knife about another axis perpendicular to the axis of oscillation, said pit finder being yieldably mounted to enable it to be displaced from the plane of its movement by said pit during separation of the pit from the meat of the peach.

LAWRENCE W. WATERS.

REFERENCES CITED

The following references are of record in the file of this patent:

UNITED STATES PATENTS

| Number | Name | Date |
|---|---|---|
| 1,512,410 | Eldridge | Oct. 21, 1924 |
| 1,785,014 | Norgaard | Dec. 16, 1930 |
| 2,061,051 | Thompson | Nov. 17, 1936 |
| 2,255,533 | Ridley | Sept. 9, 1941 |
| 2,376,526 | Thompson | May 22, 1945 |
| 2,380,530 | Jepson | July 31, 1945 |
| 2,388,682 | Ewald et al. | Nov. 13, 1945 |

FOREIGN PATENTS

| Number | Country | Date |
|---|---|---|
| 6169/32 | Australia | Feb. 17, 1932 |
| 112,506 | Australia | Feb. 20, 1941 |
| 112,634 | Australia | Mar. 13, 1941 |